March 22, 1966 GASTON DIT JACQUES GROSBETY 3,241,667
BEAN GRADER
Filed Feb. 6, 1964 5 Sheets-Sheet 1

INVENTOR
Gaston dit Jacques GROSBETY
BY

ATTORNEYS

March 22, 1966     GASTON DIT JACQUES GROSBETY     3,241,667
BEAN GRADER
Filed Feb. 6, 1964                                       5 Sheets-Sheet 2
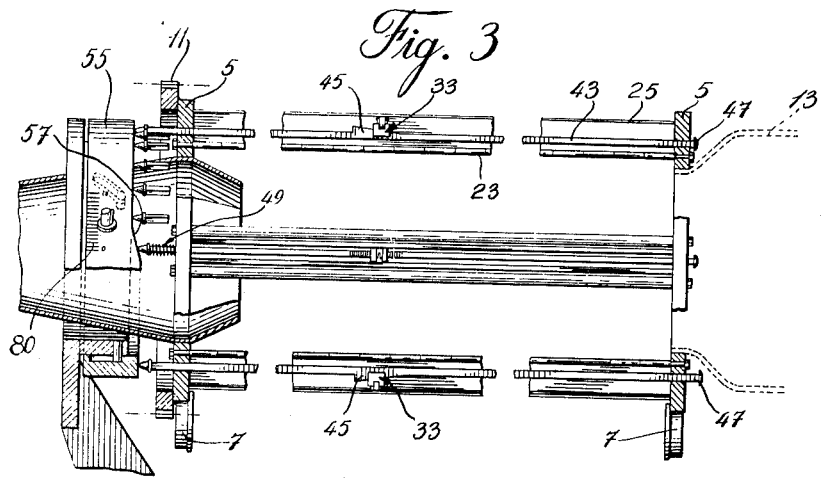
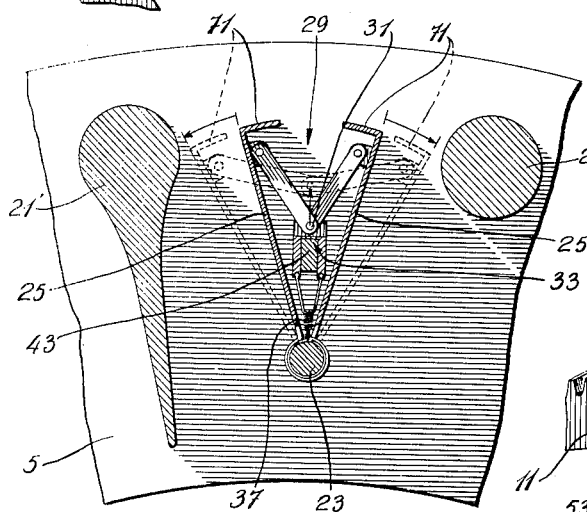
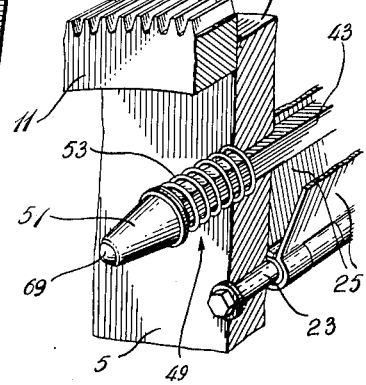
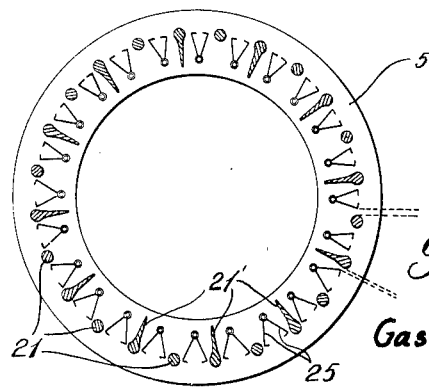
INVENTOR
Gaston dit Jacques GROSBETY
BY
ATTORNEYS March 22, 1966  GASTON DIT JACQUES GROSBETY  3,241,667
BEAN GRADER
Filed Feb. 6, 1964                                    5 Sheets-Sheet 3

INVENTOR
Gaston dit Jacques GROSBETY

March 22, 1966  GASTON DIT JACQUES GROSBETY  3,241,667
BEAN GRADER
Filed Feb. 6, 1964  5 Sheets-Sheet 4
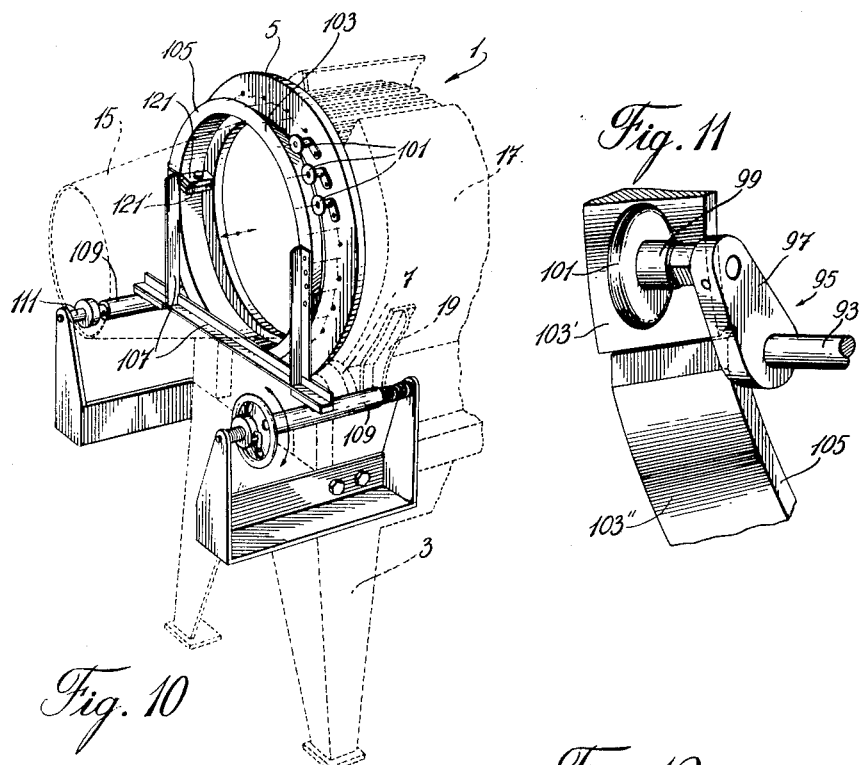
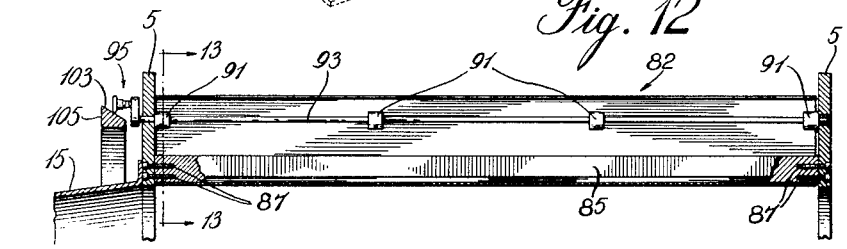
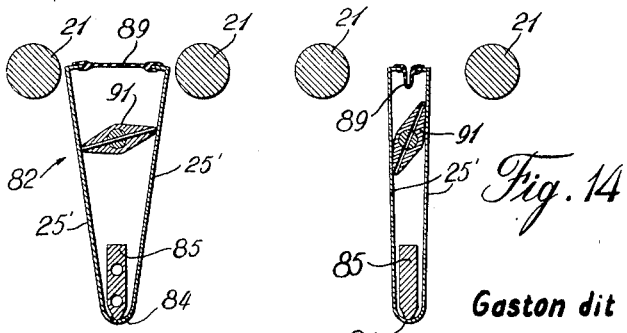
INVENTOR
Gaston dit Jacques GROSBETY
BY
ATTORNEYS

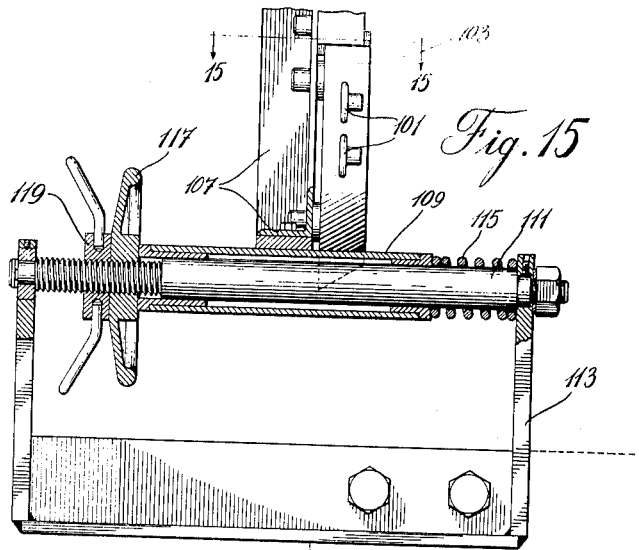
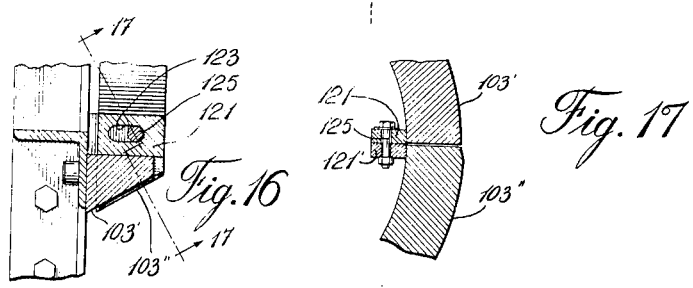
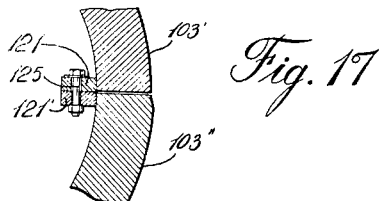
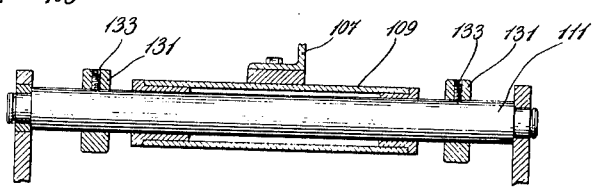
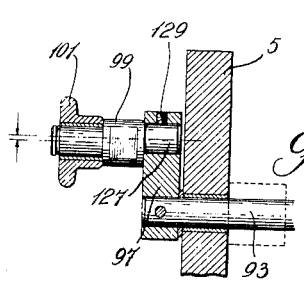
INVENTOR
Gaston dit Jacques GROSBETY
BY
ATTORNEYS United States Patent Office 3,241,667
Patented Mar. 22, 1966

3,241,667
BEAN GRADER
Gaston dit Jacques Grosbety, 2315 Blvd. de la Concorde, Duvernay, Quebec, Canada
Filed Feb. 6, 1964, Ser. No. 342,929
14 Claims. (Cl. 209—98)

The present invention relates to a grader intended to size grade whole or cut beans and wax beans, by diameter, according to established standards.

It will be understood that such a machine must be adjusted to various diameters of beans and that there presently exist such graders, called bar-type graders, which can be adjusted for various bean diameters. The difficulty with present day machines of this type is that a change from one grade diameter to another is an important operation which is time consuming as each bar has to be individually adjusted. This operation also requires that part of the machine be dismantled. In view of this difficulty, where several segregations are to be made, two or more graders are used, aligned in such a way that the output of one grader discharges into the input of the next grader. This is of course an expensive way of overcoming the difficulty in adjusting the grader bars.

More specifically, in such machines, the beans fed into the segregation drum or grading cylinder fall into circumferential pockets each formed of two circumferentially fixed radial baffles between which and at the circumferential end of which is mounted a diamond-shaped grading bar, rotatable upon its longitudinal axis. This bar therefore has two diagonal dimensions and by using one or the other of these dimensions between two adjacent baffles, it is possible to vary the distance between each baffle and the bar area immediately adjacent thereto or what may be called the bean escape clearance. Any bean, the diameter of which is smaller than this clearance, falls into the discharge hopper while the larger ones are retained in the cylinder and directed towards the discharge funnel.

From the above description, it follows that whenever a change in grade is necessary, each of the diamond-shaped bars has to be rotated 90° to obtain the second clearance. around the periphery of the grading cylinder, this operation. Since there is a relatively important number of such bars around the periphery of the grading cylinder, this operation is therefore lengthy and time consuming.

It is therefore a main object of the invention to provide a new segregation drum capable of being used for several different bean sergergations.

Another object of the invention resides in the provision of such a grading machine wherein the operation of changing the discharge clearance for the beans can be done readily and simultaneously for all grading bars.

Still a further object of the invention consists in the provision of a segregation drum wherein the control mechanism for varying the discharge clearance is located outside the grading cylinder thus avoiding the necessity of dismantling part of the machine in order to adjust the grading bars, as in previous machines of this type.

Yet another object of the invention lies in providing a segregation drum for beans wherein the control mechanism for the grading bar is quite simple and not likely to go out of order.

The above mentioned objects may be achieved in a segregation drum made according to the invention which comprises a plurality of parallel bars distributed at the periphery of the drum and longitudinally thereof; a pair of angularly disposed leaves mounted between each two successive bars for articulation, at the apex thereof, about an axis parallel to the axes of the bars; said leaves being disposed with the free edges thereof, in relation to said apex, substantially in peripheral alignment with said bars whereby the distances between said edges and said bars define escape clearances for beans having a diameter smaller than said distance, and means to articulate the leaves to vary the said distances.

In one embodiment of the invention, the articulating means comprises a toggle joint interconnecting the leaves of each pair and spring loaded pushing means operative on the knee of the joint to cause alternative opening and closing of the joint to thus articulate the leaves.

The pushing means is preferably an elongated member extending longitudinally of and between the toggle joint knee and the articulation axis; the member having a wedge block thereon adapted to apply a pushing force on an inclined surface provided on the knee and the spring means to oppose the force and pull on the knee when the wedge block is withdrawn.

Further objects and other advantages of the invention will become apparent as the following description proceeds of a specific, although non-limitative example, of the invention having reference to the appended drawing wherein:

FIG. 3 is a front elevation view of the segregation drum of the invention shown with the discharge baffle plates removed and illustrating only a limited number of leaf mechanisms including operating members, the grading bars having also been removed.

FIG. 4 is a diagrammatic transverse cross-sectional view of the segregation drum of the invention;

FIG. 5 is a cross-sectional partial view, on an enlarged scale, of the peripheral grading arrangement of the invention;

FIG. 6 is a partial perspective view, on an enlarged scale, intended to illustrate the end structure of an operating member and the leaf mechanism;

FIG. 10 is a perspective view of a second embodiment of the invention;

FIG. 11 is an enlarged perspective view of the crank structure for operating the leaves of the second embodiment;

FIG. 12 is a longitudinal cross-sectional view through the peripheral bean clearance leaves;

FIGS. 13 and 14 are two cross-sectional views along line 13—13 of FIG. 12 in two different positions of the leaves of the second embodiment;

FIG. 15 is a cross-sectional view of the ring element displacing device of the second embodiment;

FIG. 16 is an enlarged partial cross-section view through the meeting ends of the two halves of the ring element;

FIG. 17 is an enlarged partial cross-sectional view through line 17—17 of FIG. 6;

FIG. 18 is an enlarged cross-sectional view of the crank structure of the leaves operating mechanism of the second embodiment;

FIG. 19 is a further embodiment, in cross-sectional view, of the displacing device for the ring element.

Figure 1:
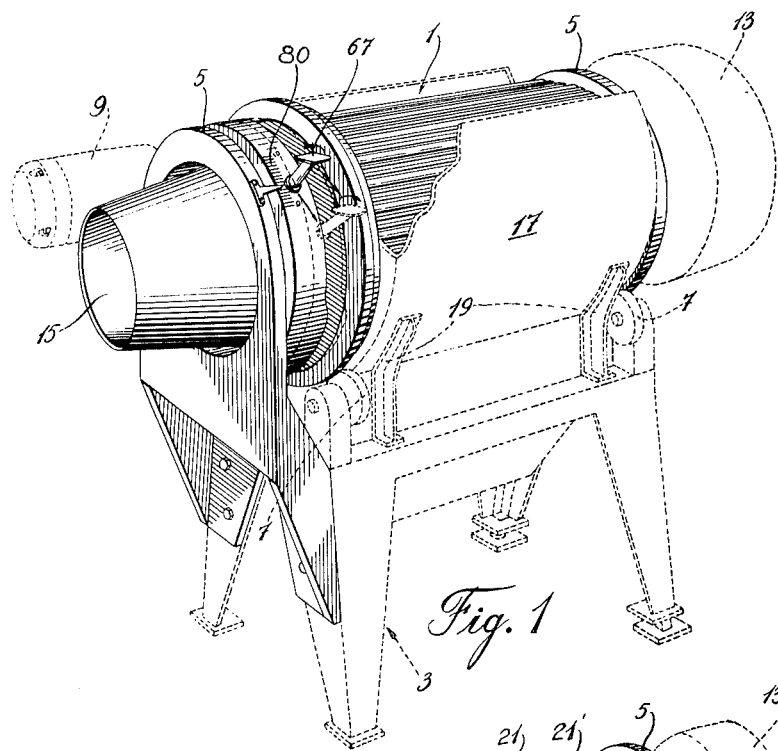
FIG. 1 is a perspective view of a segregation drum made according to the teaching of the invention.

The segregation drum of the invention generally comprises a grading cylinder 1 mounted on a base 3, cylinder 1 including two end plates 5 mounting the grading cylinder 1 on rollers 7 of base 3. The cylinder is driven into rotation by a motor 9 through a suitable speed reducer meshing with a suitable circular rack 11 (see FIGS. 3 and 6) secured at the outer periphery of one of the end plates 5.

The drum has the usual feed spout 13 extending through one end plate 5 and discharge funnel 15, projecting through the other end plate 5.

In known manner, the drum is provided with discharge baffle plates 17 supported on base 3 by brackets 19.

Figure 2:
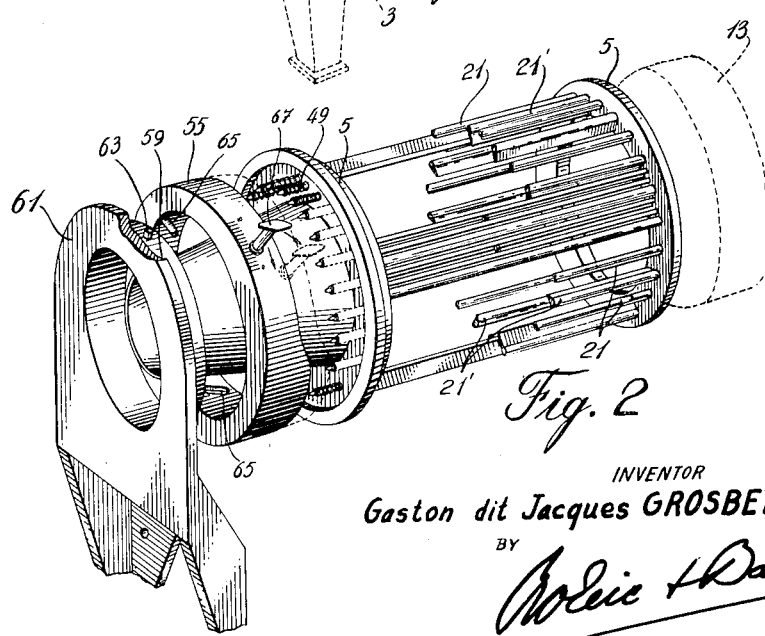
FIG. 2 is a perspective view of the segregation drum shown partly exploded and with the discharge baffle plates and leaf mechanism removed.

It will be seen from FIG. 2 that end plates 5 are interconnected by a plurality of parallel grading bars 21, 21' secured thereto and distributed generally evenly at the periphery thereof. While bars 21 are preferably circular, bars 21' which are also circular are provided with a substantially flat inwardly directed radial extension defining, with the bar, a baffle. Bars 21 and 21' alternate around the circumference of the grading cylinder 1.

A full description of the grading mechanism, according to a first embodiment, will now be described in particular conjunction with FIGS. 5 and 7.

The said grading mechanism includes an articulation axle 23 to which are pivotally mounted a pair of generally rectangular elongated substantially flat leaves 25 disposed angularly in relation to articulation axle 23. The mounting of leaves 25 on axle 23 may be in any known manner, such as the known staggered sleeve arrangement illustrated in FIG. 7 wherein one leaf is provided with a plurality of spaced sleeves 27 distributed evenly along one edge thereof, the spacing between the said sleeves 27 being occupied, in assembled condition of the mechanism, by similar sleeves 27' provided along the edge of the other leaf 25. This manner will provide a solid pivotal mounting of the two leaves 25 on articulation axle 23.

The leaves of each pair are interconnected by a toggle joint 29 having a central pivoting knee 31. Knee 31 is resiliently joined to articulation axle 23 through a spring 37 one end of which is connected to a pair of straps 35 secured to the free end of a channel-shaped connector 33. The inner surface of the web of connector 33 is inclined as at 39 and further provided with a series of spring-pressed balls 41 for a purpose to be determined later.

In between the flanges of the channel-shaped connector 33 is slidably received an operating member 43 for the toggle joint 29, the said member being provided with a wedge block 45 corresponding to each toggle joint. The operating member 43 is displaceably axially in a manner and with means to be later described and the wedge block 45 is so disposed thereon as to be constantly in engagement with inclined surface 39 of the web of channel-shaped connector 33 through the action of spring 37. Operating member 43 and wedge block 45, constitute the pushing means for toggle joint 29.

Figure 7:
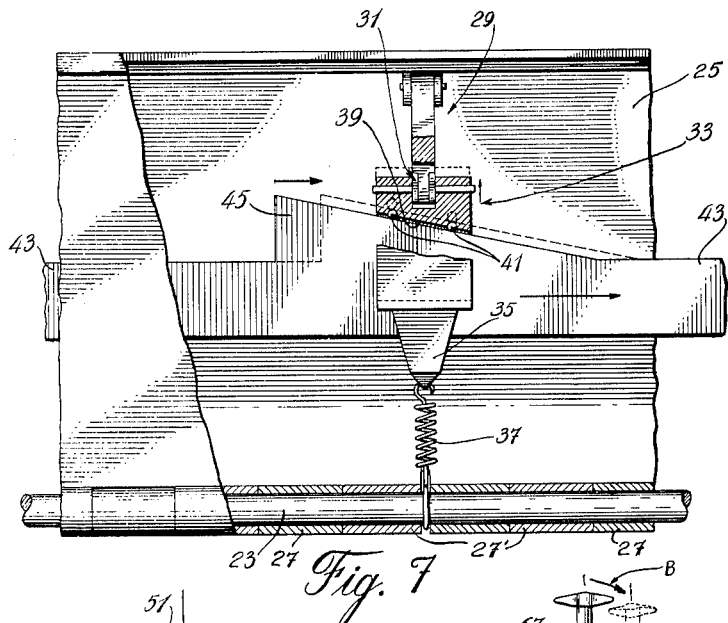
FIG. 7 is an elevation partial view, shown on an enlarged scale of a toggle joint actuating mechanism, part of one leaf being cut away for the purpose.

From the above description, it will be understood that whenever operating member 43 is displaced axially as, for example, shown by the arrows in FIG. 7, wedge block 47 pushes upwardly on toggle joint 29 to thus open the latter and increase the angularity between leaves 25 (see FIG. 5). Thus, it is possible to change the discharge clearance of the grading mechanism, that is the distance between the outer edge of leaves 25 and the adjacent bar 21 or 21'. It will be noted that the said outer edges of said leaves 25 are generally in peripheral alignment with the bars 21, 21'.

Although, as shown in FIG. 3, only one toggle joint mechanism is shown per operating member 43, it will be understood that two or more such mechanisms may be resorted to for greater convenience or efficiency.

The mechanism responsible for varying the opening of leaves 25 or the magnitude of the beam discharge clearance or grade will now be described.

All operating members 43 are mounted for slidable displacement through both end plates 5 and are provided, at one end, with a head 47 and spring means 49 at the other end which, in conjunction with the second end plate 5, forces head 47 to abut the first end plate 5. The said spring means 49 is shown, in FIG. 6, to comprise a conical tip 51 having the larger end thereof of greater diameter than the diameter of operating member 43 and a spring 53 abutting the outer surface of end plate 5, on the one hand, and the inward surface of conical tip 51, on the other hand. Thus, in accordance with the showing in FIGS. 3 and 6, all operating members 43 are constantly driven leftward for a purpose now to be determined.

The operating member actuating means consists of a circular ring-like element 55 having a radial cam edge 57 against which operating members 43 are pressed by spring means 49. It will thus be appreciated that if circular element 55 with its cam edge 57 is displaced axially of the grading cylinder, rightward from the position of FIG. 3, operating members 43 will be axially displaced an equal amount thus also displacing the wedging blocks 45 causing opening of toggle joints 29 and reducing of the discharge clearance, this action taking place against the resistance of spring 37 which tends to keep the toggle joint closed and the discharge clearance to a maximum.

From a study of FIG. 4, it will be appreciated that during the upper half rotation of the grading cylinder, the discharge clearance should be increased, that is, the toggle joint should be as closed as possible to permit the release of any bean that may have been caught in between a plate 25 and its adjoining rods 21, 21'. This would happen if the diameter of the bean would be approximately the size of the clearance opening. Thus by causing the clearance to enlarge, the bean will drop to the bottom of the grading cylinder during the upper half rotation of the cylinder. This can be achieved by having the cam edge 57 divided into two offset portions as clearly illustrated in FIG. 3. The upper portion is shown to be offset outwardly from the lower portion so that when operating members 43 move to ride on the upper half rotation, they are driven outwardly to the left by spring means 49 thus releasing their pushing force on the toggle joint which moves to the closed position by the action of spring 37.

The extent of opening of toggle joint 29 will vary in accordance with the distance of the said cam edge 57 from the adjacent outer plate 5. This may be achieved by the mechanism particularly illustrated in FIG. 9 wherein it will be seen that circular element 55 is supported on flange 59 of a supporting ring 61 secured to the base 3 of the segregation drum as better seen in FIG. 1.

The bore of circular element 55 is provided with a plurality of outwardly spring pressed radial inner pins 63, preferably three, receivable in elongated inclined, twisting or helical slots 65 through flange 59 of supporting ring 61. A handle 67 serves to actuate circular element 55.

Figures 8, 9:
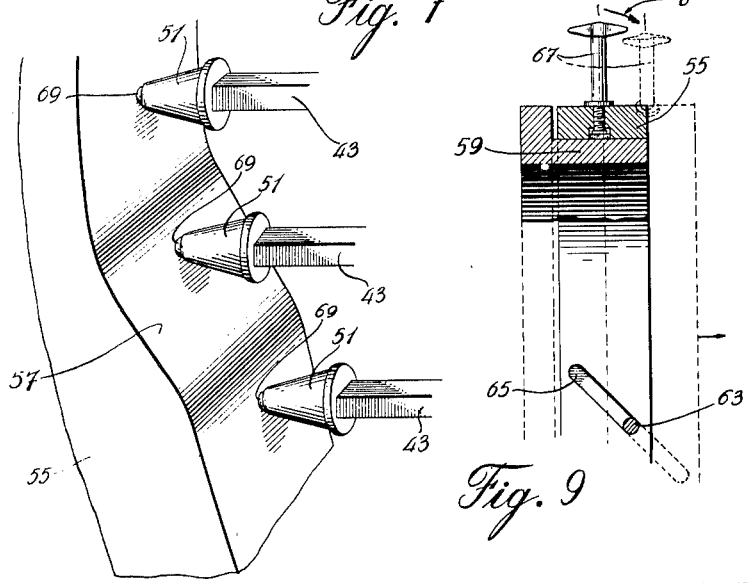
FIG. 8 is a perspective view, on a greatly enlarged scale, of part of the radial cam edge provided on the circular element, the view illustrating the operating members as abutting the said cam edge.
FIG. 9 is a partial cross-sectional view, on an enlarged scale, of the cylinder element displacing mechanism.

Thus, by actuating handle 67 in the manner shown by arrow B of FIG. 9, circular element 55 is not only pushed into limited rotation but, because of the coaction of the pins 63 and slot 65, it is driven outwardly rightwardly in relation to supporting ring 61. Thus, operating members 43 may be axially displaced simultaneously by the action of circular element 55. In consequence, opening and closing of toggle joints 29 may be controlled as well as the bean discharge clearance. A scale 80 (FIG. 1) may be provided to evaluate the extent of the variation in discharge clearance.

Of course, by modifying the discharge clearance by slightly rotating the circular element, the plane of division where the discharge clearances vary moves from horizontal to slightly inclined. This is of truly no practical importance.

As shown in FIG. 4, baffle plates 21' define between themselves, catching pockets for the beans to be graded thus tending to help in obtaining a better segregation.

For smooth operation and better efficiency, the outward end of tips 51 of operating members 43 should be provided with freely rotatable balls 69 which would roll on the radial cam edge 57.

Also, operating members 43 should preferably be other than circular in order to prevent the setting of any torsion in the members when the grading cylinder rotates.

Finally, the outward free edge of leaves 25 should be bent towards one another as at 71 of FIG. 5 in order to prevent beans from falling into the toggle mechanism in between the leaves in the upward rotation of the cylinder and eventually in the bean discharge baffle.

In the second embodiment of the invention, illustrated in FIGURES 10 to 19, the flat leaves of each grading mechanism are replaced by the lateral branches 25' of a trough-shaped elongated member 82, the said branches 25' being interconnected by a berth 84 integral therewith (see FIGURES 13 and 14).

Similarly to the pairs of leaves 25 of the first embodiment, members 82 are mounted at the periphery of the grading cylinder 1 and span the distance between end plates 5. The berth 84 of each member 82 is welded, inwardly thereof, to a holding bar 85 secured to end plates 5 by any suitable means such as by screws and pins 87.

The normal position of trough-shaped or U-shaped member 82 is that shown in FIGURE 14 wherein lateral branches 25' are upright and generally parallel. The dimensioning of members 82 and the material of which they are made are such that branches 25' are resilient and can be articulated about rod 93 to take on the open position of FIGURE 13 under suitable internal pressure while returning to the position of FIGURE 14 whenever the said pressure is relieved. It will be understood, therefore, that by so adjusting the opening of U-shaped members 82, it is possible to control the bean clearance between the top edges of the members and the adjacent grading bars 21.

The inner space of members 82 is closed by a flexible band 89 which also serves to limit the opening of the said members.

The articulating means for each members 82 comprises a plurality of diamond-shaped elements 91 securely mounted on an operating rod 93 journalling in end plates 5. Rods 93 can each be angularly displaced by movement of an operating arm 95 (FIGURE 11) formed of connecting piece 97 and a crank 99 to the free end of which is rotatably mounted a wheel 101 adapted to be pressed on the cam surface 103 of a ring element 105 by the resiliency of the corresponding U-member 82. Thus, as segregation drum 1 rotates, the opening of members 82, or the bean clearance, will be determined by the position of wheel 101 on cam surface 103.

As can readily be seen from FIGURE 12, the said position can be changed by axially displacing ring element 105. This can be achieved through the actuating means particularly illustrated in FIGURES 10 and 18 which comprises a supporting structure 107, for ring element 105, extending transversely of the discharge end and having the lateral extremities thereof secured to sleeves 109 each slidably mounted on a rod 111 supported by a bracket 113 fastened to the base 3. As shown particularly in FIGURE 15, at least one sleeve 109 is pressed away from grading cylinder 1 by a spring 115 applied against one end of said sleeve while the other end of the sleeve is acted upon by a control wheel 117 having a central threaded bore rotatable on a threaded part of rod 111. A lock nut 119 ensures that the said sleeve 109 retains the given position.

Thus, rotation of control wheel 117 axially displaces ring element 105 and causes control of the opening of the U-members 82 to thus control the bean clearance.

As with the first embodiment, it may be found advantageous to allow a larger bean clearance in the upper half rotation of the drum and for this purpose, ring element 105 may be divided into two halves giving two cam surfaces 103' and 103" axially offset one in relation to the other in such a way as to produce enlarging of the bean clearance when wheels 101 ride on the upper half of ring element 105. This, as shown in FIGURES 10, 15 and 16 particularly, may be obtained by providing interconnecting pairs of flanges 121 and 121' at the connecting ends of the ring halves with one flange of each pair having an elongated aperture 123 in which the connecting bolt 125 may slide.

It may of course be expected that the machining of the parts may not be too accurate and, for this reason, it is provided that crank 99 be mounted on connecting piece 97 (FIGURE 18) through a circular eccentric pin 127 secured in position by a set screw 129. It can thus be ensured that all wheels 101 positively rest on the cam surface 103 during rotation of the drum.

Another manner of adjusting ring element 105 is shown in FIGURE 19 wherein sleeves 109 may be fixed into position on rod 111, after having been slid into proper position, by collars 131 clamped into position by means of screw 133.

The above description is of two specific embodiments of the invention and it should be understood that many modifications may be made thereto without departing from the spirit of the invention, the scope of which is set forth in the appended claims.

I claim:

1. A segregation drum for a bar-type bean grader, said drum comprising:
    (a) a plurality of parallel bars distributed at the periphery of the drum and longitudinally thereof;
    (b) a pair of generally angularly disposed leaves mounted centrally of each two successive bars for articulation, at the apex, about an axis parallel to the axes of the bars; said leaves being disposed with the free edges thereof, in relation to said apex, substantially in peripheral alignment with said successive bars, whereby the distance between said edges and said successive bars define escape clearances for beans having a diameter smaller than said distance, and
    (c) means to articulate said leaves to vary said distances.

2. A drum as claimed in claim 1, wherein said articulating means comprises at least one toggle joint interconnecting the leaves of each pair and spring loaded pushing means operative on the knee of said joint to cause alternative opening and closing of said joint to thus articulate said leaves.

3. A drum as claimed in claim 2, wherein said leaves are mounted, at their apex, on an axle coaxial with said articulation axes and said pushing means comprises an elongated member extending longitudinally of and between said toggle joint knee and the articulation axle; said member having a wedge block thereon adapted to apply a pushing force on an inclined surface provided on said knee, and resilient means joining said knee to said axle to oppose said force and pull on said knee when said wedge block is withdrawn from said inclined surface.

4. A drum as claimed in claim 1, wherein said leaves are resiliently driven toward one another and said articulating means comprises:
    a rotatable operating rod between each pair of leaves, centrally inwardly of said parallel bars;
    at least one diamond-shaped element secured on said operating rod and adapted to contact said leaves, and
    means causing rotation of said operating rods whereby to rotate said diamond-shaped elements in contact with said leaves and cause opening of said leaves and closing thereof under the action of the resiliency of the leaves.

5. A drum as claimed in claim 4, wherein said rotation means comprises:
  a ring element mounted for axial sliding displacement toward and away from one end of said operating rods and having a peripheral cam surface inclined radially inwardly in the direction of said rod ends;
  a crank at the end of each rod and a contact wheel on said crank, offset from the rod and adapted to contact said inclined surface and be retained thereagainst by the resiliency of said leaves, whereby axial displacement of said ring element causes rotation of said rods, through said contact wheels and cranks, and opening and closing of said leaves to vary said bean clearances.

6. A segregation drum for a bar-type bean grader, said drum comprising:
  (a) a pair of parallel end plates;
  (b) a plurality of parallel bars secured to both said end plates and distributed at the periphery thereof;
  (c) articulation axles inwardly and centrally of said bars;
  (d) a pair of elongated leaves pivoted, along one longitudinal edge thereof to each of said articulation axles; the width of said leaves being such that the other longitudinal edges thereof are disposed substantially in peripheral alignment with the adjoining bars;
  (e) at least one toggle joint, having a central operating knee provided with an inclined surface, interconnecting the leaves of each pair;
  (f) spring means connecting each knee to the corresponding articulation axle to cause closing of the joint;
  (g) an operating member extending longitudinally between the toggle joint knee and the articulation axle of each pair of leaves and extending through said end plates;
  (h) a wedge block on each member adapted to cooperate with the inclined surface of the corresponding toggle joint to cause opening of said toggle joint against the action of said spring means, and
  (i) means, adjacent one of said plates, acting on said operating members to cause simultaneous displacement of said wedge blocks to actuate said joints and articulate said leaves.

7. A drum as claimed in claim 6, wherein every second one of said bars is provided with a substantially flat inwardly directed radial extension defining, with the bar, a baffle; two adjoining baffles-bars thus forming a pocket within which the beans are driven during rotation of the drum, 8. A drum as claimed in claim 6, wherein said operating members slidably extend through both end plates, plates, have a head at one end and spring means at the other forcing said head to abut the adjacent end plate and said means acting on said operating members is a circular element having a radial cam edge against which, during rotation, the tips of said operating members are forced by said spring means, and further means to displace said circular element axially of said drum to adjust the position of said operating members to thus control the opening of said toggle joints and leaves.

9. A drum as claimed in claim 8, wherein said cam edge has a lower portion offset from an upper portion wherein, during rotation of the drum the opening of the toggle joint during the lower portion of the rotation may be different from that during the upper portion of the rotation.

10. A segregation drum for a bar-type bean grader, said drum comprising:
  (a) a pair of parallel circular end plates;
  (b) a plurality of parallel circular bars secured to both said end plates and evenly distributed at the periphery thereof to form therewith a grading cylinder;
  (c) articulation axles mounted on said end plates inwardly and centrally of said grading bars;
  (d) a pair of elongated leaves pivoted, along one longitudinal edge thereof to each of said articulation axles; the width of said leaves being such that the other longitudinal edges thereof are disposed substantially in peripheral alignment with the adjoining bars; whereby to open outwardly of said grading cylinder and form, between said last edges and the adjoining bars, escape clearances for the beans of smaller diameter;
  (e) at least one toggle joint, having a central operating knee provided with an inclined surface, interconnecting the leaves of each pair;
  (f) spring means connecting each knee to the corresponding articulation axle to cause closing of the joint;
  (g) an operating member extending longitudinally between the toggle joint knee and the articulation axle of each pair of leaves and extending through said end plates;
  (h) a wedge block on each member adapted to cooperate with the inclined surface of the corresponding toggle joint to cause opening of said toggle joint against the action of said spring means;
  (i) a non-rotating circular element having a radial cam edge; said element being mounted with the said cam edge facing one of said end plates;
  (j) spring means forcing the tips of said operating members against said cam edge, whereby as said grading cylinder rotates, said operating members and wedge blocks are displaced in accordance with the shape of the cam edge to correspondingly vary the opening of said toggle joints and leaves, and
  (k) means to displace said circular member axially of said grading cylinder.

11. A drum as claimed in claim 10, wherein said cam edge has a lower portion offset from an upper portion whereby, during rotation of the drum the opening of the toggle joint during the lower portion of the rotation may be different from that during the upper portion of the rotation.

12. A drum as claimed in claim 10, wherein every second one of said bars is provided with a substantially flat inwardly directed radial extension defining, with the bar, a baffle; two adjoining baffle-bars thus forming a pocket within which the beans are driven during rotation of the drum.

13. A segregation drum for a bar-type grader, said drum comprising:
  (a) a pair of parallel circular end plates;
  (b) a plurality of parallel circular bars secured to both said end plates and evenly distributed at the periphery thereof to form therewith a grading cylinder;
  (c) a plurality of elongated U-shaped resilient clearance members having a pair of lateral leaves;
  (d) means mounting said clearance members between said end plates; one clearance member being disposed between each two successive bars and opening radially outwardly with the tips of said leaves arranged in peripheral alignment with said bars; said means securing only the berth of said U-shaped member to said end plates whereby said leaves are free to move toward and away from one another;
  (e) a rotatable operating rod between each pair of leaves, centrally inwardly of said parallel bars;
    at least one diamond-shaped element secured on said operating rod and adapted to contact said leaves, and
    means causing rotation of said operating rods whereby to rotate said diamond-shaped elements in contact with said leaves and cause opening of said leaves and closing thereof under the action of the resiliency of the leaves.

14. A drum as claimed in claim 13, wherein said rotation means comprises:
a ring element mounted for axial sliding displacement toward and away from one end of said operating rods and having a peripheral cam surface inclined radially inwardly in the direction of said rod ends;
a crank at the end of each rod and a contact wheel on said crank, offset from the rod and adapted to contact said inclined surface and be retained thereagainst by the resiliency of said leaves, whereby axial displacement of said ring element causes rotation of said rods, through said contact wheels and cranks, and opening and closing of said leaves to vary said bean clearances.

References Cited by the Examiner
FOREIGN PATENTS 1,114,731 12/1955 France.
1,218,074 12/1959 France.

M. HENSON WOOD, Jr., *Primary Examiner.*

C. H. SPADERNA, *Assistant Examiner.*